United States Patent [19]
Montgomery et al.

[11] Patent Number: 5,387,941
[45] Date of Patent: Feb. 7, 1995

[54] DATA WITH VIDEO TRANSMITTER

[75] Inventors: Gerald D. Montgomery; Jay B. Norrish, both of Mesa, Ariz.

[73] Assignee: WavePhore, Inc., Tempe, Ariz.

[21] Appl. No.: 947,134

[22] Filed: Sep. 18, 1992

Related U.S. Application Data

[63] Continuation-in-part of Ser. No. 715,920, Jun. 14, 1991.

[51] Int. Cl.⁶ .................. H04N 7/08; H04N 11/00
[52] U.S. Cl. .................... 348/473; 348/486; 348/488; 348/549
[58] Field of Search ............... 348/473–475, 348/461, 432, 433, 436, 665, 607, 608, 478, 464, 468, 476, 505, 507, 549, 385, 386, 426, 438, 437, 463, 465, 467, 486, 488, 469, 460, 536, 539, 512, 520; 370/69.1, 123, 76, 57, 121; H04N 7/087, 7/08, 7/00, 11/00

[56] References Cited

U.S. PATENT DOCUMENTS

| | | | |
|---|---|---|---|
| 2,838,597 | 6/1958 | De Vrijer | 178/5.2 |
| 3,529,081 | 9/1970 | Rider | 178/5.86 |
| 3,543,169 | 11/1970 | Hill | 358/171 |
| 3,632,863 | 1/1972 | Hirashima et al. | 348/434 |
| 3,679,816 | 7/1972 | Avins et al. | 358/19 |
| 3,700,793 | 10/1972 | Borsuk et al. | 178/6.8 |
| 3,845,326 | 10/1974 | Godden | 307/230 |
| 3,925,639 | 12/1975 | Hester | 235/61.11 E |
| 3,927,250 | 12/1975 | Rainger | 178/5.6 |
| 4,051,532 | 9/1977 | Hilbert et al. | 358/142 |
| 4,074,199 | 2/1978 | de Jager et al. | 325/50 |
| 4,155,039 | 5/1979 | Lechevin | 325/20 |
| 4,177,405 | 12/1979 | Chapdelaine | 315/159 |
| 4,183,054 | 1/1980 | Patisaul et al. | 358/86 |
| 4,208,630 | 6/1980 | Martinez | 375/7 |
| 4,209,748 | 6/1980 | Weber | 455/47 |
| 4,231,114 | 10/1980 | Dolikian | 455/49 |
| 4,354,200 | 10/1982 | Haenen et al. | 358/23 |
| 4,379,947 | 4/1983 | Warner | 179/1 GD |
| 4,424,593 | 1/1984 | Kahn | 455/47 |
| 4,479,226 | 10/1984 | Prabhu et al. | 375/1 |
| 4,513,415 | 4/1985 | Martinez | 370/92 |
| 4,538,174 | 8/1985 | Gargini et al. | 358/86 |
| 4,539,707 | 9/1985 | Jacobs et al. | 455/47 |
| 4,551,754 | 11/1985 | Meise et al. | 358/180 |
| 4,556,973 | 12/1985 | Uemura | 358/142 |
| 4,578,815 | 3/1986 | Persinotti | 455/15 |
| 4,586,078 | 4/1986 | Citta et al. | 358/86 |
| 4,591,906 | 5/1986 | Morales-Garza et al. | 358/84 |
| 4,602,279 | 7/1986 | Freeman | 358/86 |
| 4,622,694 | 11/1986 | Weber et al. | 455/47 |

(List continued on next page.)

FOREIGN PATENT DOCUMENTS

| | | |
|---|---|---|
| 0156709 | 10/1985 | European Pat. Off. . |
| 0246698 | 11/1987 | European Pat. Off. ............ 358/147 |
| 263449 | 4/1988 | European Pat. Off. ....... H04N 7/08 |
| 278192 | 8/1988 | European Pat. Off. ....... H04N 7/08 |
| 356903 | 3/1990 | European Pat. Off. ....... H04N 7/04 |
| 0360615 | 3/1990 | European Pat. Off. ....... H04N 7/08 |
| 365431 | 4/1990 | European Pat. Off. ....... H04L 5/02 |
| 61-92084 | 5/1986 | Japan . |
| 62-236288 | 10/1987 | Japan ............................ H04N 7/08 |
| 1-089886 | 4/1989 | Japan .................................. 358/147 |
| 3-148979 | 6/1991 | Japan ............................ H04N 7/12 |
| 92/22984 | 12/1992 | WIPO . |

OTHER PUBLICATIONS

International Search Report for International Application No. PCT/US 92/10406 mailed Oct. 7, 1993.

(List continued on next page.)

Primary Examiner—James J. Groody
Assistant Examiner—Safet Metjahic
Attorney, Agent, or Firm—Spensley, Horn, Jubas & Lubitz

[57] ABSTRACT

Signal processors for permitting the transparent, simultaneous transmission and reception of a data signal in the video bandwidth is disclosed. The signal processor in the transmitter rasterizes the data at the horizontal scanning rate and modulates the data with a data carrier at a non-integral multiple of the horizontal scanning rate to obtain frequency interleaving. The data is transmitted during the active video portion of each video line.

37 Claims, 10 Drawing Sheets

U.S. PATENT DOCUMENTS

| | | | |
|---|---|---|---|
| 4,626,913 | 12/1986 | Gurumurthy | 358/147 |
| 4,647,483 | 3/1987 | Ota | 358/310 |
| 4,665,431 | 5/1987 | Cooper | 358/145 |
| 4,688,097 | 8/1987 | Lin | 380/15 |
| 4,745,476 | 5/1988 | Hirashima | 358/145 |
| 4,750,036 | 6/1988 | Martinez | 358/147 |
| 4,750,206 | 6/1988 | Schotz | 381/4 |
| 4,800,428 | 1/1989 | Johanndeiter et al. | 358/142 |
| 4,805,020 | 2/1989 | Greenberg | 358/147 |
| 4,807,031 | 2/1989 | Broughton et al. | 358/142 |
| 4,855,811 | 8/1989 | Isuardi | 348/473 |
| 4,879,606 | 11/1989 | Walter et al. | 358/330 |
| 4,884,139 | 11/1989 | Pommier | 358/142 |
| 4,958,230 | 9/1990 | Jonnalagadda et al. | 258/186 |
| 4,969,041 | 11/1990 | O'Grady et al. | 358/142 |
| 4,985,769 | 1/1991 | Yasumoto et al. | 358/141 |
| 5,014,125 | 5/1991 | Pocock et al. | 358/86 |
| 5,057,920 | 10/1991 | Wilkinson | 358/171 |
| 5,063,446 | 11/1991 | Gibson | 358/142 |
| 5,075,773 | 12/1991 | Pullen et al. | 358/141 |
| 5,103,297 | 4/1992 | Yamade | 358/31 |
| 5,142,354 | 8/1992 | Suzuki et al. | 358/34 |
| 5,157,359 | 10/1992 | Nogami et al. | 332/117 |
| 5,177,604 | 1/1993 | Martinez | 358/86 |
| 5,200,822 | 4/1993 | Bronfin | 358/142 |
| 5,243,423 | 9/1993 | DeJean et al. | 358/142 |

OTHER PUBLICATIONS

U.S. Patent and Trademark Office, Examiner's Action, Application Ser. No. 08/076,196, mailed Sep. 2, 1993.

Tomasi, Wayne, *Electronic Communications Systems: Fundamenals Through Advanced* Prentice Hall, New Jersey, 1988, p. 481.

U.S. Patent and Trademark Office, Examiner's Action, Application Ser No. 08/076,137, mailed Oct. 13, 1993.

International Search Report for International Application No. PCT/US 92/03711 filed Apr. 5, 1992.

King, Patrick T., *A. Novel Television Add-On Data Communication System*, Journal of the SMPTE, vol. 83, No. 1, Jan. 1974, pp. 10-13 Subtitle ML.

Maebara, Akiyoshi and Seizo Tamai, *A Television Facsimile System Employing an Additional Carrier*, New Broadcasting System Research Group, Serial No. 151, Feb. 1972.

Christiansen, M.; T. Roste; and J. N. Skalvik, *A Video Scrambler/Descrambler Concept for the PAL Format*, Journal of the Institution of Electronic and Radio Engineers, vol. 57, No. 1, Jan./Feb. 1987 pp. 27-35.

Gerdes, Richard, "Using Genesys TM HDTV Technologies for Today's Expanded NTSC Service". Presented at 1990 Spring Engineering Conference, National Association of Broadcasters, Apr. 1, 1990, Atlanta, Ga.

Gerdes, Richard, "Waveform Modulation as Used in Television Applications". Presented at RF Technology Expo 90, Mar. 28, 1990. Anaheim, Calif.

Gerdes, Richard, "Genesys TM HDTV Technologies Expand Existing NTSC Service". Presented at the 24th Annual SMPTE Television Conference, Society of Motion Picture and Television Engineers, Jan. 1990, Lake Buena Vista, Fla.

Gerdes, Richard, "Arizona Based HDTV:; The Genesys TM Technologies." Presented at Phoenix Chapter of the Society of Broadcast Engineers, Arizona Broadcasters Association Fall Meeting, Nov. 10, 1989. Phoenix, Ariz.

Gerdes, Richard, "HDTV Management Timetable." Presented at Challenges in Teleproduction, The Internat'l Teleproduction Society Annual Forum, Sep. 17, 1989, Los Angeles, Calif.

Gerdes, Richard, "The Use of Genesys TM Technology for HDTV". Presented at the 130th SMPTE Technical Conference Society, of Motion Picture and Television Engineers, Inc., Oct. 15-19, 1988. New York, N.Y.

King, Patrick T., "A Novel TV Add-On Data Communication System," I.E.E.E. Transactions on Broadcast and Television, vol. BTR-19, No. 4, pp. 225-230; Nov. 1973.

DATA WITH VIDEO TRANSMITTER

This application is a continuation-in-part of U.S. patent application No. 07/715,920 filed on Jun. 14, 1991.

BACKGROUND OF THE INVENTION

1. Field of the Invention

This invention relates to transmitting two signals on one communication channel and more particularly transmitting data during the active video portion of a video signal.

2. Description Of the Prior Art

Several techniques have been developed to allow the transmission of two signals on the same communications channel. When the communications channel is a specified bandwidth of the spectra, these methods include time division multiplexing, transmitting orthogonally polarized waves, transmitting by two transparent methods, each transparent to the other and frequency interleaving.

In the case of video signals, such as NTSC and PAL signals, several different methods have been used for transmission of additional information in the band. For example, a chrominance (color) signal is transmitted by frequency interleaving the chrominance signal with the luminance (black and white) signal. In particular, for the NTSC standard, the luminance signal and the chrominance signals are frequency interleaved. Of course, the chrominance signals are closely related to the luminance signal and the signals exhibit a high degree of correlation.

There are also intervals where no picture information is being transmitted such as during the vertical and horizontal blanking intervals. In some systems, for example close captioned television for the hearing impaired, the close captioned information is transmitted during the vertical blanking intervals. Of course, the data rate of transmission systems using the blanking period is relatively low, typically about 20,000 bits per second. Although such transmission rates may be suitable for close caption television, this is far too low for the suitable transmission of large volumes of information such as the 1.544 megabits per second for T1 transmission.

Therefore, it is a first object of this invention to permit transmission at a higher data rate than those permitted during the blanking period. It is a second object of this invention to permit transmission at the higher data rate without causing any noticeable interference from the transmitted information to conventional television receivers. It is yet a third object of this invention to achieve such transmission using frequency interleaving.

SUMMARY OF THE INVENTION

These and other objects are achieved through the use of transmission of secondary data during the active primary video interval when pixel information is being transmitted rather than during the horizontal or vertical sync blanking intervals. The transmitted data is preferably frequency interleaved with the chrominance and luminance signal.

The signal processor for use by the transmitter for the novel communications system disclosed herein has five portions. A primary video portion, a timing portion, and a video analyzer portion receive the primary video signal. The timing portion produces a non-integral multiple of the video horizontal scanning frequency for use by a data portion for modulation. In addition, the timing portion produces a composite blanking pulse so that the data portion may rasterize the data to be transmitted.

Another portion, a noise interference reduction portion receives an output from the video portion and provides a noise signal representing noise in the frequency gaps for interleaving of the primary video signal. That noise signal may be subtracted from the video signal to reduce the noise imposed on the modulated data signal when the video and data signals are combined.

A secondary data portion receives the secondary data signal, which may be analog or digital. The secondary data portion rasterizes the data signal and modulates the data signal so that the modulated data signal is frequency interleaved with the primary video signal.

The data portion rasterizes the data signal to include vertical and horizontal blanking periods that will coincide with those blanking periods in the primary video signal when the modulated data signal and the primary video are combined. The rasterized data signal is then modulated by a data carrier so that the modulated data spectral envelope interleaves with the primary video envelope. The resultant combined signal may be received by ordinary video receivers without noticeable interference in the video receiver.

The data signal may be recovered by a receiver incorporating a specialized signal processor. A filter passing those frequencies containing the secondary data supplies a data signal to a phase compensator. The phase compensator eliminates phase shifts induced by the filter. The output of the compensator may then be demodulated, decoded and derasterized. To accomplish the demodulation, a timing circuit should be included that generates the data carrier and generates a system clock including a blanking interval.

DETAILED DESCRIPTION OF THE PREFERRED EMBODIMENTS

Figure 1:
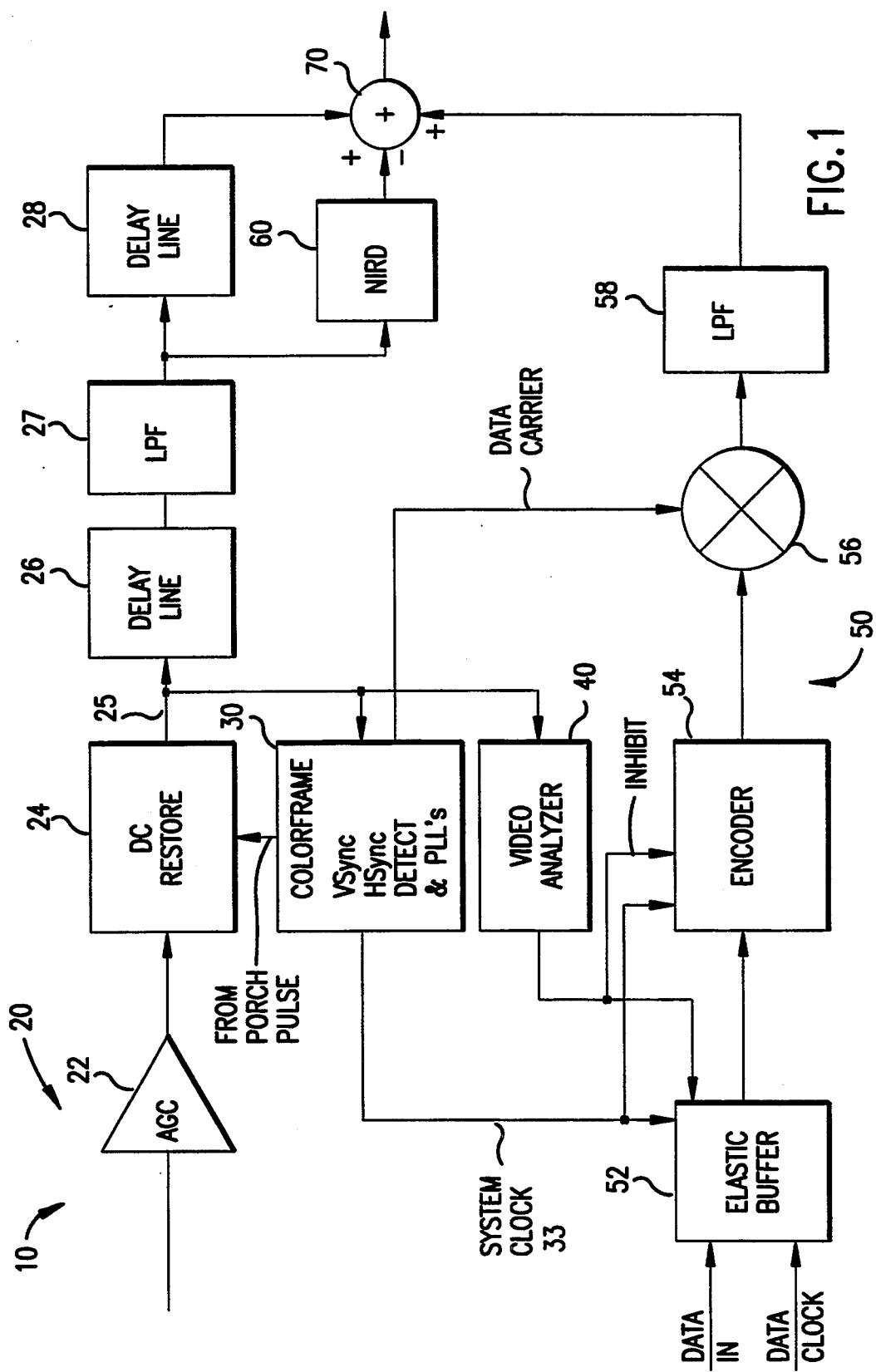
FIG. 1 is a block diagram for a signal processor incorporating an embodiment of the instant invention for use in a transmitter.

FIG. 1 shows an embodiment of the signal processor 10 of the transmitter that may be used for transmitting secondary digital data at the T1 rate of 1.544 Megabits per second through a transmitter with a primary NTSC color video signal. Other embodiments of the invention may be used for transmitting digital data at other data rates or analog data with either an NTSC video signal or another video format signal.

The embodiment 10 comprises five different sections. These sections are a primary video section 20, a timing section 30, a video analyzer section 40, a secondary data modulation section 50 and a noise reduction section 60. An analog summer or adder 70 combines the outputs of the data modulation section 50, the noise reduction section 60 and the primary video section 20. It should be noted, however, that the video section 20, the video analyzer section 40 and the noise reduction section 60 may not be needed depending upon the data rate of the data signal, the quality of the primary video signal and channel noise.

A primary video signal, which in this embodiment may be an NTSC color signal having a horizontal blanking frequency of 15,734.264 hertz and a vertical blanking frequency of 59.940052 hertz is received. The primary video signal comprises luminance and chrominance signals. The NTSC signal also has vertical and horizontal blanking intervals determined by the vertical and horizontal sync pulses and an active video interval between blanking intervals. During the active video intervals, the pixel information for a line of the video picture is transmitted, However, it should be understood that the primary video signal may be any rasterized video signal including video formats commonly used in other countries such as PAL. The primary video signal, which is at baseband, is supplied to the primary video section 20, the timing section 30 and the video analyzer 40.

The peak to peak amplitude of the primary video signal is limited to a predetermined standard by an automatic gain control amplifier 22 and the horizontal blanking sync pulse level of the video signal is set to a predetermined voltage by a DC restore circuit 24. If the primary video signal is an NTSC signal, the function of the DC restore circuit 24 and the automatic gain control amplifier 22 is to supply a signal at an output 25 that complies with the RS 170A standard. If the primary video signal meets the RS 170A standard, the amplifier 22 and the restore circuit 24 may be eliminated.

The output 25 is supplied to a first analog delay line 26. The length of the first analog delay line 26 should at least be equal to the time period required by the video analyzer section 40 to analyze a group of pixels of the primary video signal as will be described below. The output of the delay line 26 is supplied to a low pass filter 27 that reduces noise in the upper band of the video signal. The output of the filter 27 is supplied to a second delay line 28, which provides a delay equal to the delay of the noise interference section 60. The output of the primary video section 20 is supplied to a non-inverting input of the summer 70.

The noise interference section 60 comprises a narrow band comb filter called a noise interference reduction device. That filter blocks the frequency bands containing the luminance and chrominance signal information. The output of the noise interference section 60 comprises the noise component of the video signal lying in the gaps between the frequencies of luminance and chrominance frequency bands. The noise component is then supplied to an inverting input of the adder 70 to remove that noise component present in the primary video section 20 output.

The input data is supplied to a first in first out elastic buffer 52 along with an external clock signal. The data clock controls the rate at which data is stored in the buffer 52. The rate at which data is outputted by the elastic buffer 52 is controlled by two signals, a second, system clock/rasterizing signal 33 provided by the timing section 30 and an inhibit signal supplied by the video analyzer section 40.

The elastic buffer 52 only outputs data at a predetermined rate during the active video portions of the signal as indicated by the system clock signal 33. The system clock 33 is used for rasterizing the data output of the elastic buffer 52 to create blanking intervals.

No data is outputted from the elastic buffer 52 during blanking intervals. The blanking intervals when no data is outputted from the buffer are adjusted sufficiently to synchronize the blanking periods of the output of the video portion 20 and the data portion 50 to the summer 70.

Further, in high speed data transmission such as T1, the elastic buffer 52 is inhibited from outputting data during portions of the video line having sharp transitions as will be explained in more detail below. When the video analyzer section 40 does not inhibit the elastic buffer, the output of the elastic buffer 52 is a rasterized version of the input secondary data; i.e., the data has the same duration blanking intervals and those blanking intervals coincide at the output of the data section 50 with the blanking intervals in the video signal at the output of the video section 20 when they arrive at the adder 70.

The rasterized, secondary data signal from the buffer 52 is supplied to the encoder 54, which also receives the system clock 33 and the inhibit signal from the video analyzer 40. The encoder 54 encodes the data to limit the bandwidth. The encoder 54 may be a NRZ encoder, an FM encoder, an MFM encoder, a Manchester encoder, a 1,7 RLL encoder, a 2,7 RLL encoder or any other encoder that limits the bandwidth of the rasterized data signal output from the elastic buffer 52. In addition, data scramblers and block error correction coders may be included to provide security or to improve the bit error rate.

The output of the encoder is supplied to a multiplier 56 for modulating the encoded data on a data carrier. The encoded data is phase synchronized with a data carrier and is amplitude modulated by the multiplier 56. In this particular embodiment, the modulated carrier is either present or is not present depending upon whether the encoded data is a one or zero.

However, in other embodiments, different modulation schemes may be used. For low secondary data rate transmissions, the encoded data need not be synchronous with the modulated data and one data bit may be transmitted over several cycles of the data carrier. For higher data rates, where the encoded data is synchronous with the data carrier, more than two levels may be permissible for higher data rate transmission. For example, a half cycle may have a zero level peak, a $\frac{1}{3}$ maximum level peak, a $\frac{2}{3}$ maximum level peak and a maximum level peak so that two data bits may be transmitted in one half cycle. Other techniques may be used for increasing the data rate such as quadrature amplitude modulation, quadrature phase shift keying and phase modulation where the data and the data carrier are synchronized. Data rates of 280 kilobits per second have been found not to require such multibits per half cycle modulation techniques.

The modulated data carrier including the encoded data is passed through a low pass filter 58 that permits only the lower sideband and the data carrier to be transmitted. The higher sideband of the data carrier and all harmonics are blocked by the low pass filter 58.

The output of the low pass filter 58 is supplied to a noninverting input of the adder 70 for combining the modulated, rasterized secondary data with the processed video. The timing of the data portion 50 and the video portion 20 is such that the blanking intervals in the video signal supplied to the adder 70 coincide with the inhibited intervals of the rasterized modulated data signal. The combined signal from the video portion 20 and the data portion 50 is a signal at the baseband frequency with the information for the data signals and the information for the video signals frequency interleaved into separate bands respectively with minimal overlap. The interleaved signal may then be transmitted at normal data rates.

The timing section 30 comprises a vertical sync detector, a horizontal sync detector, a color frame detector and phase lock loops that use the detected signals for generating various timing signals. In particular, the data carrier is generated in this embodiment by dividing the horizontal scanning rate of the primary video signal by four and then multiplying the scanning rate by one thousand and forty three through the use of a phase lock loop to generate a data carrier at 4,102,708 hertz. Since the data signal has been rasterized and then modulated at a non-integral multiple of the horizontal frequency at the modulator 56, the spectral envelope of the video signal, when combined by the adder 70 to the video signal, is frequency interleaved with the video signal. Further, the data carrier should have a known phase relationship with the color frame.

Although a specific example has been selected for the data carrier, other non-integral multiples may be used. The criteria for the data carrier are that the data carrier: (1) should be a non-integral multiple of the horizontal scanning frequency, (2) should be preferably greater than the chrominance carrier, and (3) should be preferably outside the luminance band but be well enough within the video channel bandwidth so that there is not likely to be interference with aural channels.

In addition, the timing section uses phase lock loops to generate a system clock rasterizing signal 33 for outputting data from the elastic buffer 52. The system clock frequency should be either a submultiple or a multiple of the horizontal scanning frequency. The selection of the system clock frequency should be based upon the maximum data transmission rate during an active video line and the data clock rate. The clock should be inhibited for a period equal to each video and horizontal blanking interval so that no modulated data is combined with the video signal at the adder 70 during blanking intervals of the primary video signal; i.e. the blanking intervals in the output of the video 20 and data portion 50 should be synchronized. Further, the system clock rate should be sufficiently high so that the elastic buffer will not overflow.

The use of phase lock loops for generating both the system clock and the data carrier means that the two signals are phase related. This allows for transmission by a modulator at higher data rates by, for example, having each half cycle of the data carrier representing one data element for transmission.

A third output of the timing section is a pulse indicating the occurrence of the front porch of the horizontal sync pulse. This front porch pulse is provided by using any of several front porch pulse detector circuits (not shown) and is used by the DC level restore circuit 24 to set the blanking level to be compatible with the RS 170A standard.

In higher data rate transmission systems, a video analyzer 40 may also be included. The video analyzer 40 includes a digital signal processor that analyzes the active portion of the video signal for information representing a group of pixels in a line representing a sharp transition. The video analyzer searches for signal information representing a sharp transition that would generate strong high frequency clusters of the luminance or chrominance signals. Then, an inhibit signal is sent to both the elastic buffer 52 and the encoder 54. The inhibit signal is time shifted so that no secondary data is supplied to the adder 70 when the primary video information representing the sharp transition is being outputted by the video portion 20. The use of the video analyzer 40 further reduces the possibility of interference between the secondary data and the primary video. The video analyzer may also insert start and stop codes into the data stream so that the receiver will recognize when data transmission has been inhibited to avoid interference.

The video analyzer 40 is only believed to be necessary in high data rate systems such as T1 and above. For lower data rate systems, the video analyzer 40 and the inhibit signal may be eliminated. In those systems that have the video analyzer, the delay line 26 in the primary video section 20 must delay the primary video signal sufficiently for the time period for processing of a group of pixels by the analyzer 40. If the data transmission rate is relatively low such as two hundred eighty kilobits per second, however, the video analyzer 40 and the delay line 26 may be eliminated.

The result at the output of the summer 70 is that the primary video signal and the data are frequency interleaved. In addition, the combined signal from the summer 70 still has the same type of blanking intervals found in the standard NTSC signal. Therefore, the video signal may be received by a standard NTSC receiver without detecting the secondary transmitted data.

To further ensure against interference, the output signal levels of the noise interference section 60 and the secondary data section 50 should be scaled. The scaling should set the injection level of those two sections to the adder 70 to avoid interference. The output level of the noise interference section 60, should be adjusted to minimize noise on the received data signal at a receiver. The output level of the data section 50 should be adjusted so that there is no noticeable interference on a video monitor coupled to the output of the adder 70.

In certain applications, it may be desirable to transmit an additional low frequency signal such as an audio signal. For example, an audio signal may be sampled using compression techniques such as in U.S. Pat. No. 5,021,786 and be transmitted during the horizontal sync intervals. If the secondary data is for example compressed video, the audio signal for both a right and a left audio channel for the compressed video may be sampled twice during each active interval and added during the horizontal sync pulses. A multiplexer controlled by the timing signal may be used for adding the compressed digital data during the horizontal sync pulses.

Figure 2:
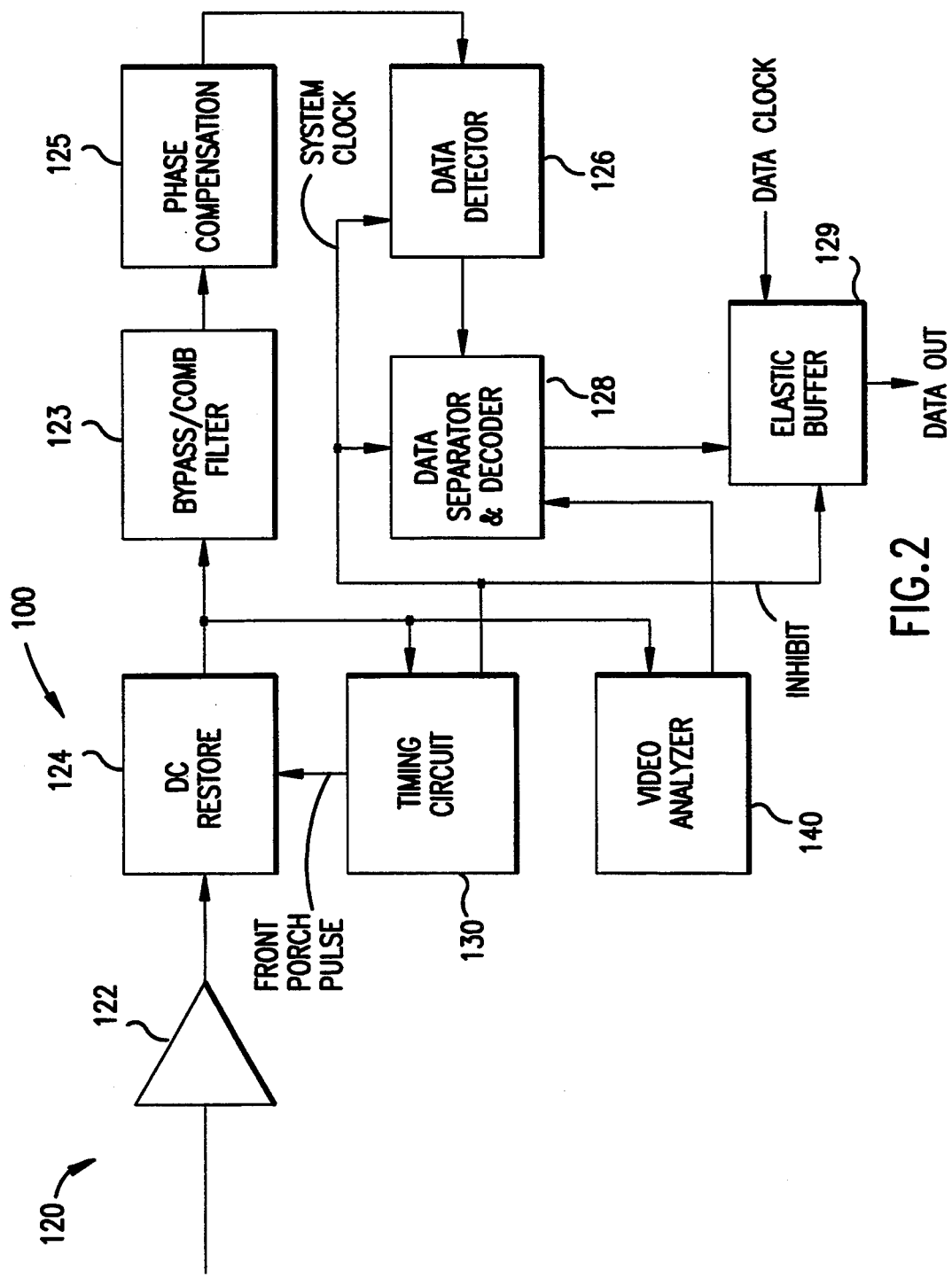
FIG. 2 is a block diagram for a signal processor incorporating an embodiment of the instant invention for use in a receiver.

FIG. 2 shows a signal processor 100 for a video receiver that separates the transmitted data from the signal transmitted by a video transmitter incorporating the processor 10 of FIG. 1. Again, although this embodiment is shown for receiving a primary NTSC signal having secondary digital data frequency interleaved with the video, other embodiments may use for other video signals and primary data.

In FIG. 2, the received baseband signal, containing both video and digital information is processed by two sections, a video section 120, a timing circuit 130 and a video analyzer section 140. The video section 120 processes the received baseband signal through an automatic gain control amplifier 122 and a DC restore circuit 124. The output of the DC level restore circuit is supplied to a noise image device 123 having filtering characteristics similar to the noise image device 60 in the transmitter. The output of the noise image device 123 in the receiver 110 is to pass the interleaved frequencies containing the transmitted data signals but to block the primary video signal. The output of the noise image device 123 is supplied to a phase compensator 125 that adjusts for phase distortion due to the noise imaging device 123. The phase compensator 125 may be a second filter having an inverse phase delay of the noise imaging device 123 to adjusts for the phase distortion introduced by the noise image device 123.

The phase compensated output signal is a reproduction of the rasterized and modulated data signal supplied to the adder 70 by the data portion 50. The rasterized modulated data signal is supplied to a data level detector 126, which also receives a system clock signal, The data level detector 126 comprises a peak detector that detects a peak detected signal in each period of the system clock. For a data receiver compatible with a data transmitter of FIG. 1, the data level detector output is preferably a digital signal that represents a one when a data carrier half cycle is present and a zero when a data carrier half cycle is not present.

Although the above mentioned data level detector 126 is designed for the transmitter 10, it should be understood that the data level detector may be of any other format that has been chosen to be compatible with the data transmission or modulation format of the transmitter 10. For example, the data level detector may be a phase detector if the data is phase modulated, or a quadrature amplitude detector if the transmitter uses quadrature amplitude modulation for the data. Further, if the data rate is sufficiently low where a bit of data is transmitted over several cycles, for example 64 kilobits per second, the data level detector may be an envelope detector.

At high data rates, a circuit for detecting synchronously modulated data may be needed. A clock recovery circuit may be used for recovering the clock encoded in the data. That recovered clock may be used for sampling the modulated data. That sampled, modulated data may be provided to an analog to digital converter to produce a digital signal. Alternatively, a low pass filter, a rotator and a slicer may be used with the data level detector.

The output of the data level detector 126 is supplied to a data separator and decoder 128 that provides the digital data as an output. The data separator and decoder 128 receives from the timing circuit 130 a time adjusted composite blanking signal, and a regeneration of the data carrier outputted by the timing circuit 30. The data separator and decoder 128 also receives a video inhibit signal from a video analyzer 140. The data decoder 128 uses the data level bits for each clock period, the data carrier, the blanking composite signal and the inhibit signal to provide data at the same clock rate at the output as the data provided to the elastic buffer 52 of the transmitter. The data decoder and separator 128 will also remove the encoding provided by the encoder 54 in the transmitter 10.

The output of the separator 128 is provided to an first in first out elastic buffer 129. The rate at which data is inputted to the buffer 129 is controlled by the system clock from the timing block 130. The data may be outputted from the buffer by a second clock (not shown) at any desired data rate that prevents the buffer from overflowing.

The video analyzer 140 and the timing block 130 operate in the manner of the timing section 30 and the video analyzer 40 in the transmitter 10. The analyzer 140 and the timing block 130 prevent the data decoder and separator 128 from reading blanking intervals in the rasterized data or inhibit periods transmitted in the data. So that the data signal will be properly recovered a delay line (not shown) should be included before the data level detector, where the delay line compensates for the processing period of the video analyzer 140.

It should be noted however, that if the video analyzer 40 of FIG. 1 inserts start/stop codes in the data stream when data transmission is inhibited due to interference considerations, the receiver does not need a video analyzer 140. Instead, the data detector and separator 128 may detect these start/stop codes as part of the decoding function.

Figure 3:
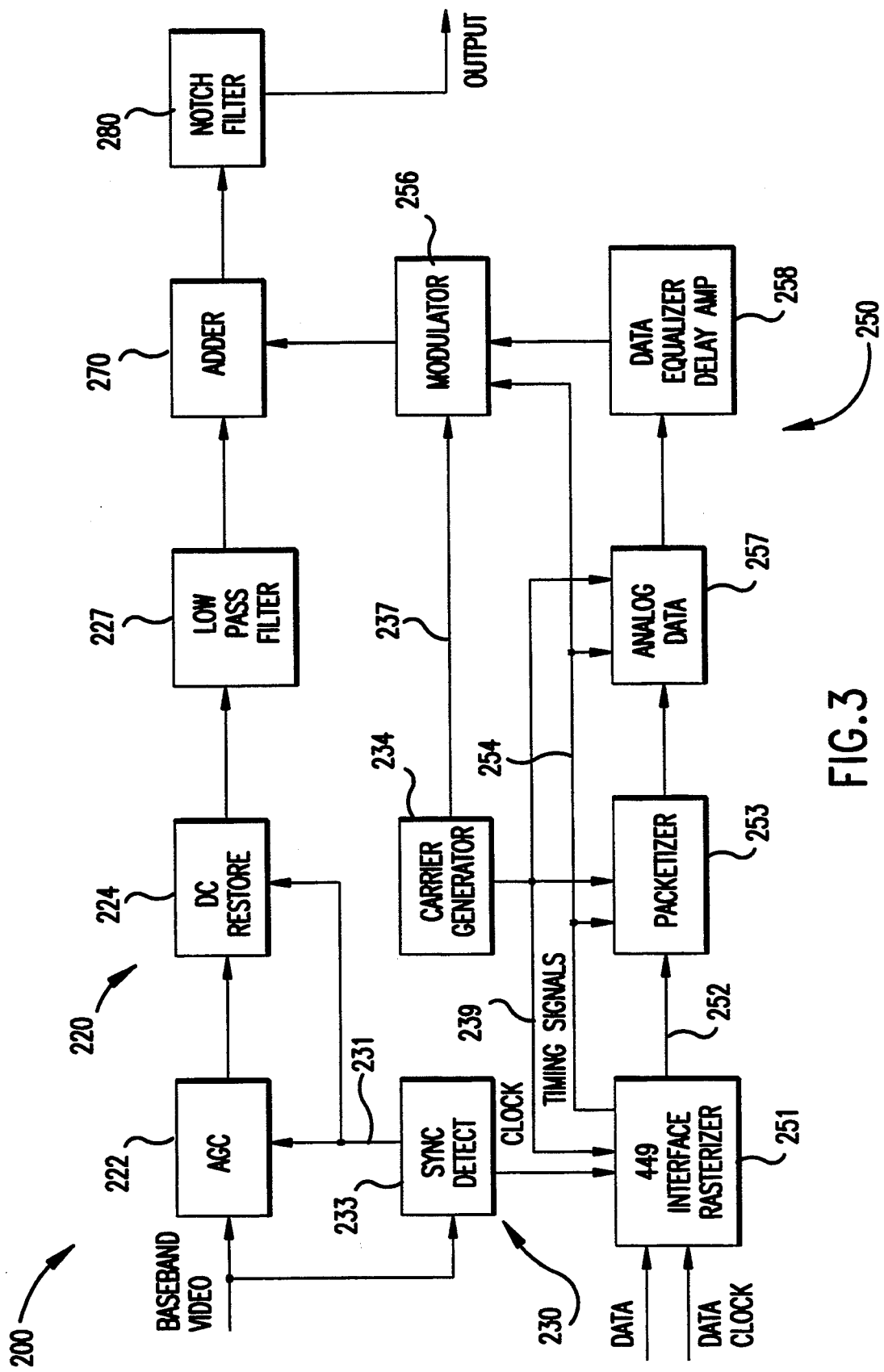
FIG. 3 is a block diagram for a signal processor incorporating a second embodiment of the instant invention for use in a transmitter.

FIG. 3 shows an alternative embodiment 200 of the processor 10 of FIG. 1 for the transmitter with like components bearing like numbers. This embodiment 200 includes a video section 220, a timing section 230, a data section 250 and an adder 270 but lacks a noise interference reduction section 60 and may lack a video analyzer section 40.

In this embodiment, however, the input baseband video signal is preferably slightly modified by the video section 220. Using an NTSC signal for example, the portion of the spectrum envelopes of the luminance and chrominance information in the upper sideband of the chrominance portion of the video signal should preferably be attenuated. For example, in a system using NTSC video, virtually all spectral energy in the video signal above 3.7 megahertz may be eliminated by the low pass filter 227. The selection of the cutoff frequency for the video signal depends upon the characteristics of the particular video signal format and the cutoff frequency should be selected so that sufficient color video information will be transmitted so that to a viewer at the ordinary receiver no color information will be lost.

Further, the timing section 230 has a sync detector 232 that generates a sync detection signal 231 for the automatic gain control amplifier 222 and the DC restore circuit 224 and generates a composite video sync signal 233 marking each horizontal and vertical blanking interval. The timing circuit 230 includes a carrier generator 235 generating a data carrier 235 that is preferably a non-integral quarter multiple of the horizontal scanning frequency of the video signal near the edge of the video signal bandwidth. In particular, a carrier of 4,197,114 hertz has been found to be desirable for an NTSC rasterized video baseband signal. The data carrier may be obtained by dividing the horizontal frequency by four and using phase lock loops to multiply the frequency by an appropriate multiplier such as 1067. Alternatively, the carrier generator 235 may be a free running oscillator operating at a frequency at or near a quarter, odd multiple of the horizontal scanning rate such as 4,197,114 hertz. Preferably, for minimal interference with and optimal frequency interleaving of the data signal with the luminescence and chrominance information, the data carrier 234 should be an odd quarter multiple of the horizontal scanning rate near the upper end of the video baseband frequency spectrum. The carrier generator 235 also outputs a clock signal 239 at the same frequency as the clock. This clock signal 239 should preferably have a set phase relationship with the carrier signal 234 and may be a squared up version of the carrier signal 234.

The data section 250 includes an IEEE RS 449 Interface/rasterizer 251, a packetizer 253, an analog data converter 257 and a data equalizer and delay amplifier 258 and an amplitude modulator 256. The IEEE RS 449 interface/rasterizer 251 receives the incoming data signal and the data clock, the composite sync signal 233 and the clock signal 239. The IEEE RS 449 interface/rasterizer 251 has a first in first out buffer where data is clocked in by the data clock and clocked out under control of the clock 239 and the composite sync signal 233 denoting the timing of both horizontal and vertical blanking intervals in the video signal. Preferably to include a synchronization marker in each line, the data output 252 of the buffer in the interface/rasterizer 251 is clocked out at a rate sufficiently low so that blanking intervals and a synchronizer marker may be inserted into the output data stream of the data section 250. The interface/rasterizer 251 also provides timing signals 254 to the packetizer 253, the analog data converter 257 and the modulator 256.

The packetizer 253 packetizes bit packages of the rasterized data 252 into packets after encoding the data 252 to randomize that data. Randomizing techniques such as providing the data 252 to a five bit shift serial register where the third and fifth bit of the register are exclusive OR'ed with the input data bit may be used. Any other randomizing technique that prevents discernable patterns from appearing on the video screen of a television receiver may be used. Unique start codes are added to the beginning of each packet and CRC or other error correction codes may also be included at the end of a packet. Although it is not necessary unique stop codes may be included at the end of a packet. Each packet contains preferably about one thousand bits including all start codes and error correction coding.

One or more timing signals 254 control the output of the packetizer 253 so that the output of the data section 250 is zero during the appropriate periods so that the output of the amplitude modulator 256 is zero during the blanking intervals of the video signal from the video section 220. In addition, the timing signals 254 may further cause the blanking interval in the output of the data section 250 to be several cycles of the data carrier longer than the blanking interval of the output of the video section 220 so that a data carrier burst may be inserted at the start of each active video line for synchronization.

Preferably, the timing signals 254 also control the output of each bit in the packet so that the modulation of the data carrier is synchronous with the data. In one embodiment, the duration of a bit cell is seven cycles of the data carrier. Hence, the timing signals 254 control the output of the packetizer so that one data bit is supplied to the analog data converter for every seven cycles of the data carrier.

The output of the packetizer 253 is provided to the analog data converter 257 that serves to band limit the output of the packetizer. This analog data circuit 257 provides an analog data bit comprised of a positive, rounded (band limited) pulse for each one in the input data stream and a negative, rounded (band limited) pulse for each zero in the data stream. Other coding schema for higher data rates such as quadrature amplitude modulation may also be used.

The output of the analog data circuit 257 is supplied to a data equalizer and delay amplifier 258 in response to the timing control signals 254 so that the analog data bit will be synchronously modulated by the data carrier that controls the peak output level of the output of a modulator 256. The equalizer and delay amplifier 258 alters the phase of the output of the analog data circuit 257 to compensate for phase distortion caused by the notch filter 280 described below. The equalizer and delay amplifier 258 also preemphasizes the frequencies above at least 100 kilohertz and preferably above 300 kilohertz so that subsequent recovery of the data signal and video signal are enhanced to avoid cross-over noise effects when an attenuated, modulated data signal is combined with the video signal as described below.

One of the timing signals 254 provided by the IEEE RS 449 interface/rasterizer 251 causes the modulator 256 to output an unmodulated burst of approximately seven cycles of the data carrier 234. The unmodulated burst of the data carrier 234 is preferably provided to coincide with the start of each active video interval so that it may be readily detected by the receiver 300 of FIG. 4 to obtain data carrier synchronization as will be explained below. With the inclusion of the data carrier burst, the active data interval at the output of the modulator 256 preferably has a duration slightly shorter than the active video interval to provide for a small safety margin so that neither data nor the data carrier burst is transmitted during the video blanking intervals. The timing signals 254 also set the delay for the analog data signal so that the blanking intervals in the data will coincide with the output of the video section 220.

Alternatively, a phase synchronizer marker to augment the data carrier burst comprised of a string of ones may be inserted into the data stream at the output of the analog data circuit 257 at the start of the two hundred and sixty third line pursuant to the appropriate timing control signals 254. This string of ones lasts for a half line and may also be used by the receiver for maintaining synchronization as will be explained below.

The output of the equalizer and amplifier 258 is used by the amplitude modulator 256 to amplitude modulate the data carrier. Since the data has been rasterized and the data carrier frequency is a quarter, non-integral multiple of the horizontal scanning rate, the spectrum of the modulated data carrier overlapping with the spectrum of the video signal will interleave with the spectrum of the luminance and the chrominance portions of the video signal.

The adder 270 controls the peak to peak amplitude of the modulated data signal so that the modulated data signal is injected at a low level. For example, a signal such as twenty decibels below the level of the output of the video section 220 may be used. Further, it should be noted that the timing control signals 254 control the outputs of the output of the analog data circuit 257 and the amplifier 258 so that the output of the modulator 256 is zero during the vertical and horizontal blanking intervals of the output signal of the filter 227.

The output of the adder 270 is then supplied to a notch filter 280 having a stop band at the frequency range of the audio portion of the video signal. The output of the notch filter may then have the audio portion added and the entire combined signal may be transmitted through an appropriate transmitter (not shown) at the appropriate frequency for the channel.

Figure 4:
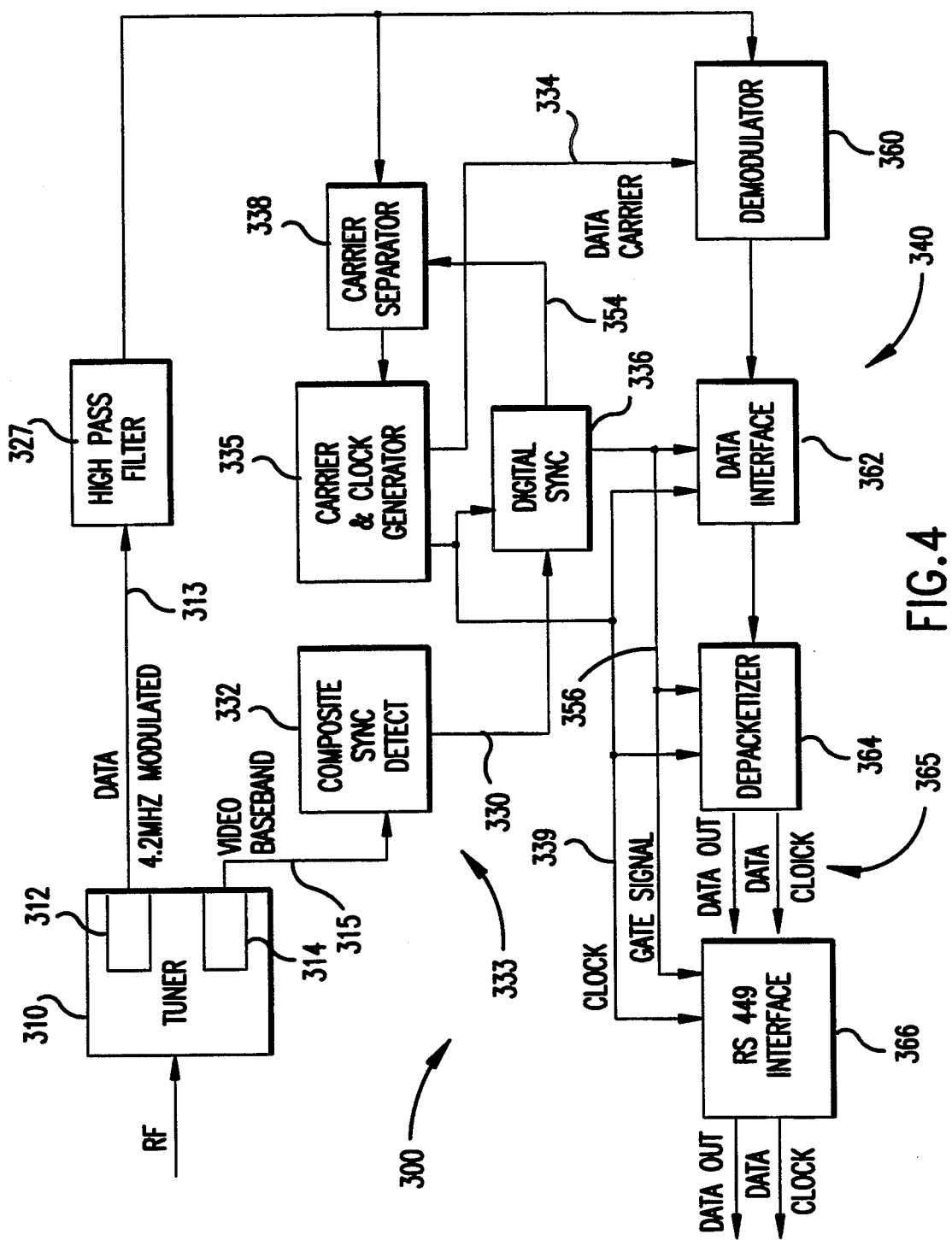
FIG. 4 is a block diagram for a signal processor incorporating a second embodiment of the instant invention for use in a receiver.

FIG. 4 shows a second embodiment 300 of a signal processor for a receiver compatible with the embodiment 200 of FIG. 3. The embodiment 300 comprises three sections: a tuner section 310, a timing section 330 and a data section 340. The input is an RF video signal with an injected data signal such as the output of the embodiment 200 at an RF frequency such as 54–60 MHZ for an NTSC signal allocated to channel 2.

The tuner section 310 processes the combined received video and data signal and provides an IF frequency signal to a data tuner section 312 and a video tuner section 314 that process separate portions of the received IF signal. The video tuner 314 comprises a band pass filtering section with a surface acoustical wave filter that passes frequencies below the chrominance subcarrier; i.e., those frequencies that contain relatively little data spectral energy. The video tuner 314 hetrodynes the IF video signal to produce a baseband video signal 315. This video baseband signal 315 need not contain much video information as long as the horizontal and vertical synchronizing signals are well defined. The video baseband signal 315 is supplied to a sync detector 332 that provides a composite video sync signal 333 marking the horizontal and vertical blanking intervals in the baseband video signal 315.

The data tuner 312 includes a band pass filtering section including a surface acoustical wave filter that passes IF frequencies in the data bandwidth. The output of the filtering section is then hetrodyned to provide a 4.2 MHZ modulated data signal 313. The output of the high pass filter 327 approximates the input to the summer 270 from the modulator 256 in FIG. 3.

That output approximation signal from the filter 327 is demodulated with a data carrier 334 provided by the timing section 330 to a demodulator 360 selected to be compatible with the modulator of the transmitter section. The demodulated output is then sampled by a data interface 362 to provide digital data. In an embodiment, the data interface may in response to a gating signal 356 sample the output of the demodulator 360 and provide digital data at TTL levels in response to that sampling. The digital data from the digitizer 362 is stripped by a de-packetizer 364 and the start codes and any error correction codes are removed by the depacketizer 364 and the data is descrambled. If error correction codes are used, the de-packetizer also corrects any transmission errors to the extent possible.

The digital data output of the de-packetizer 364 is supplied to a IEEE RS 449 Interface 366 along with a variable rate data clock. That interface 366 includes a first in first out buffer (not shown) into which the data is clocked under control of the clock signal 365. The data is supplied at the output of the interface 366 preferably under control of the variable data clock generated by the de-packetizer 364.

In addition to generating the composite sync signal 333, the timing section 330 includes a carrier separator 338 and a data carrier generator 335. To provide phase synchronization between the data carrier 234 of the transmitter 200 and the data carrier 334 in the receiver 300, the carrier separator 338 detects the phase synchronizer marker data carrier burst at the start of each horizontal line. Timing for detecting the burst at the start of each horizontal line is provided by a digital synchronizer 234 through timing control signals 354 generated by the digital synchronizer 336. The carrier separator 338 supplies a phase control signal to a carrier generator 335 so that the phase of the data carrier 334 in the receiver is synchronized to the phase of the data carrier 234 in the transmitter and the two data carrier frequencies are locked. The phase and frequency lock may be accomplished in the same manner that the color subcarrier in a conventional receiver may be synchronized to the color subcarrier in the transmitter. The carrier generator 335 also generates a clock signal 339 at the same frequency as the data carrier 334 and in a known phase relationship with the data carrier 334. In an embodiment, the data clock 339 may be merely a squared up version of the data clock obtained through a comparator.

In the embodiment 300 of FIG. 3, the digital synchronizer 336 should preferably be adjusted so that the gating signals 356 and the timing control signals 354 are adjusted to compensate for the phase delays produced by the high pass filter 327 and a low pass filter (not shown) in the demodulator 360. In particular, the output of the demodulator 360 should with the exception of noise and distortion replicate the output of the analog data circuit 257 in the transmitter 200. Hence, the digital synchronizer 336 provides the gating signal to preferably sample the output of the demodulator when the positive or negative peaks of the analog data signal are expected to occur. In addition, the digital synchronizer 336 also supplies gating signals 356 to the depacketizer 364 so that the blanking intervals may be removed from the data stream.

The depacketizer 364 preferably supplies both data and a data clock 365 to the RS 499 Interface 336. This data clock is generated by the depacketizer 364 by counting the number of bits transmitted during the immediate previous video frame. If less data is transmitted during the most recent frame, the data clock rate decreases to follow the data rate. If more data is transmitted during the most recent frames up to the maximum rate, the data clock rate increases. The adjustment of the clock rate is such that generally there will be data in the buffer of the interface 366. However, it should be noted that when no or minimal data is being transmitted for several frames, the buffer will empty.

To further augment phase synchronization, an optional string of ones transmitted during the two hundred sixty third line described above may be used for altering the phase of the clock 335. The timing circuitry 330 identifies the vertical sync pulse of the transmitted signal. Once the timing circuitry 330 has identified the vertical sync pulse, the first half of the two hundred and sixty third line can be identified. Either the interface circuit 366 or the digital sync 336 generate a signal (not shown) to alter the phase of the carrier until synchronization of the phase of the carrier between the input and the output has been obtained as detected by the appropriate element. Preferably, phase synchronization is accomplished by the digital synchronizer 336 controlling the phase of the carrier so that the string of ones marker transmitted during the first half of the two hundred sixty third line is a maximum positive amplitude. In addition, the carrier from the generator 335 has its phase continually adjusted in this manner to sustain phase synchronization between the carrier of the transmitter processor 200 and the receiver processor 300.

By using the techniques disclosed herein for the embodiments 200 and 300, data transmission of 384 kilobits per second can be attained. By resorting to quadrature amplitude modulation, a T1 data rate may be attained.

The embodiments of 200 and 300 may include of a video analyzer (not shown) like the analyzer 40 in the embodiment 100 of FIG. 1. This analyzer may further reduce any interference between the video signal and the data signal. The analyzer detects sharp transitions in the video signal. Upon detection of such transitions which results in high frequency spectral components in the luminance band spectra above a predetermined limit, transmission of data is halted after insertion of the appropriate start/stop codes into the data stream. The depacketizer in the receiver 300 detects the start/stop codes and appropriately depacketizes the transmitted data in response to such codes.

Although the foregoing embodiments are designed for a video signal that is in the NTSC format and transmitting digital data for frequency interleaving, other embodiments of the instant invention may be used. The video signal for transmission may be for example a signal in the PAL or the SECAM format, any rasterized HDTV signal, or any other signal that has been rasterized. Further, the data may be analog or digital data and the transmission and reception formats may be synchronous or non-synchronous depending upon the data rate. A particular useful application for the disclosed invention is to transmit a compressed video signal or ACTV signal.

Figure 5:
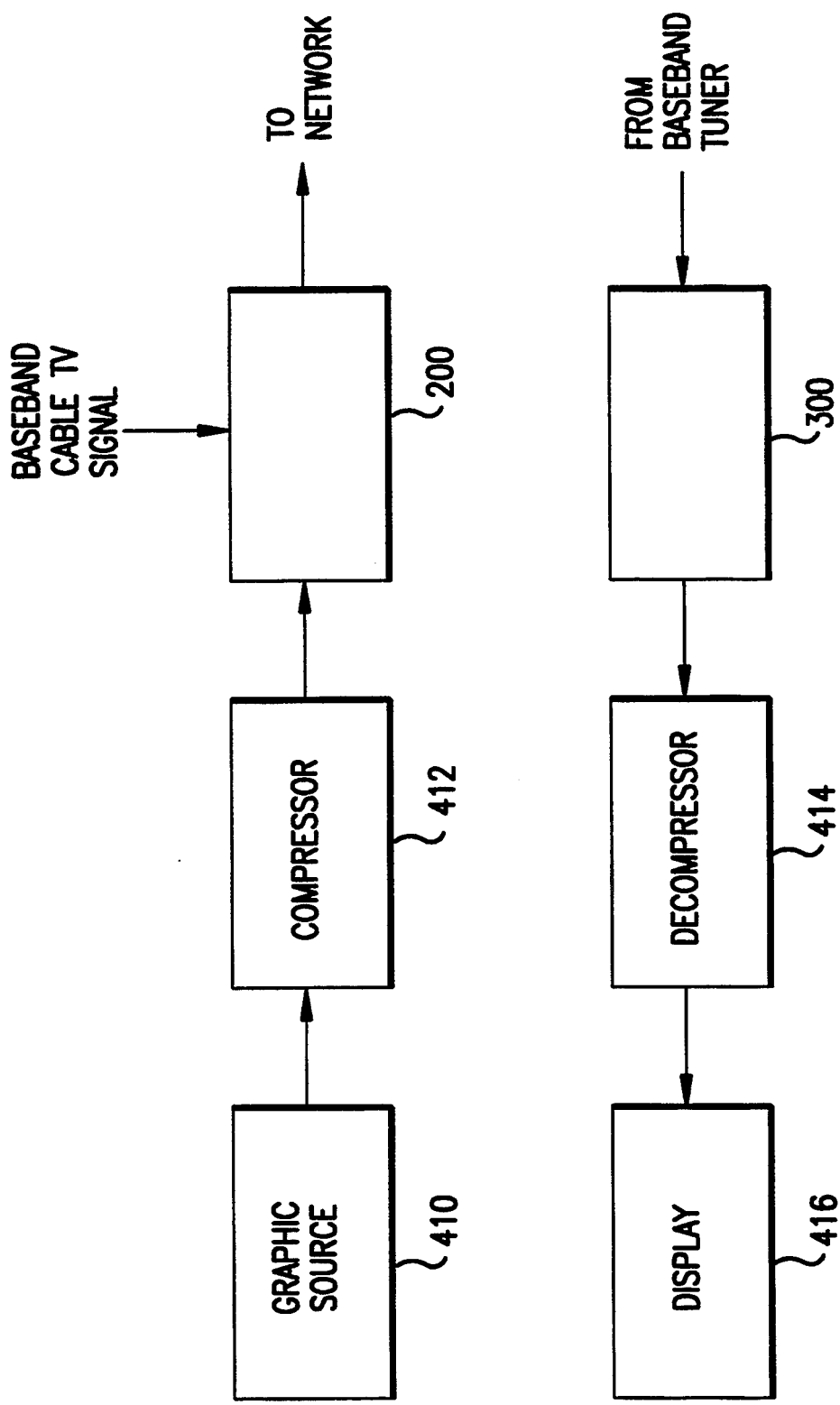
FIG. 5 is a block diagram of an embodiment of the instant invention for transmission of medical images.

Due to the high data rates obtainable by the disclosed embodiments, the instant invention also has particular application for transmission of large (five by seven inch), high quality digitized graphics or pictures of greater than 400 dots per inch resolution, particularly using conventional data compression techniques. Data transmission is either entirely or primarily from a source to one or more targets. An example of such a system would be for transmission of medical graphics over a television cable network or a video signal over the airwaves. As shown in FIG. 5, digitized medical graphical data from an X-ray machine, computer assisted tomography scanner, nuclear magnetic resonance machine or the like 410 is compressed using a commonly available compressor 412 such as those using JPEG or MPEG. The output of the compressor 412 is supplied as the data to a transmitter processor 200. Alternatively, the input signal may be from a high definition facsimile or from stored graphical data stored in a high density medium. The video input signal to the processor 200 for example be a cable TV signal for a particular channel at baseband or may be a standard television signal at baseband for transmission over the airways. In addition, the combined signal may be transmitted via a satellite transponder for long distance transmission. Due to the large number of video channels available, additional graphical inputs 412 may also be combined with the baseband video from other channels for transmission over the cable.

A receiver processor 300 may be coupled to receive the baseband output of an appropriate tuner (not shown) tuned to the selected channel channels for reception of the different transmitted data. The data output may then be decompressed at a decompressor 414 and displayed on the appropriate medium 416 such as a high quality graphics printer or a SVGA or XGA display.

Alternatively, high data rate signals may be transmitted in one direction through a high capacity communications channel comprised of a transmitter processor 200, a television cable network and receiver processors 300 located at a plurality of sites. Other data is transmitted from the sites at a much lower data rate may be transmitted over lower capacity transmission media such as telephone lines or cellular networks.

Figure 6:
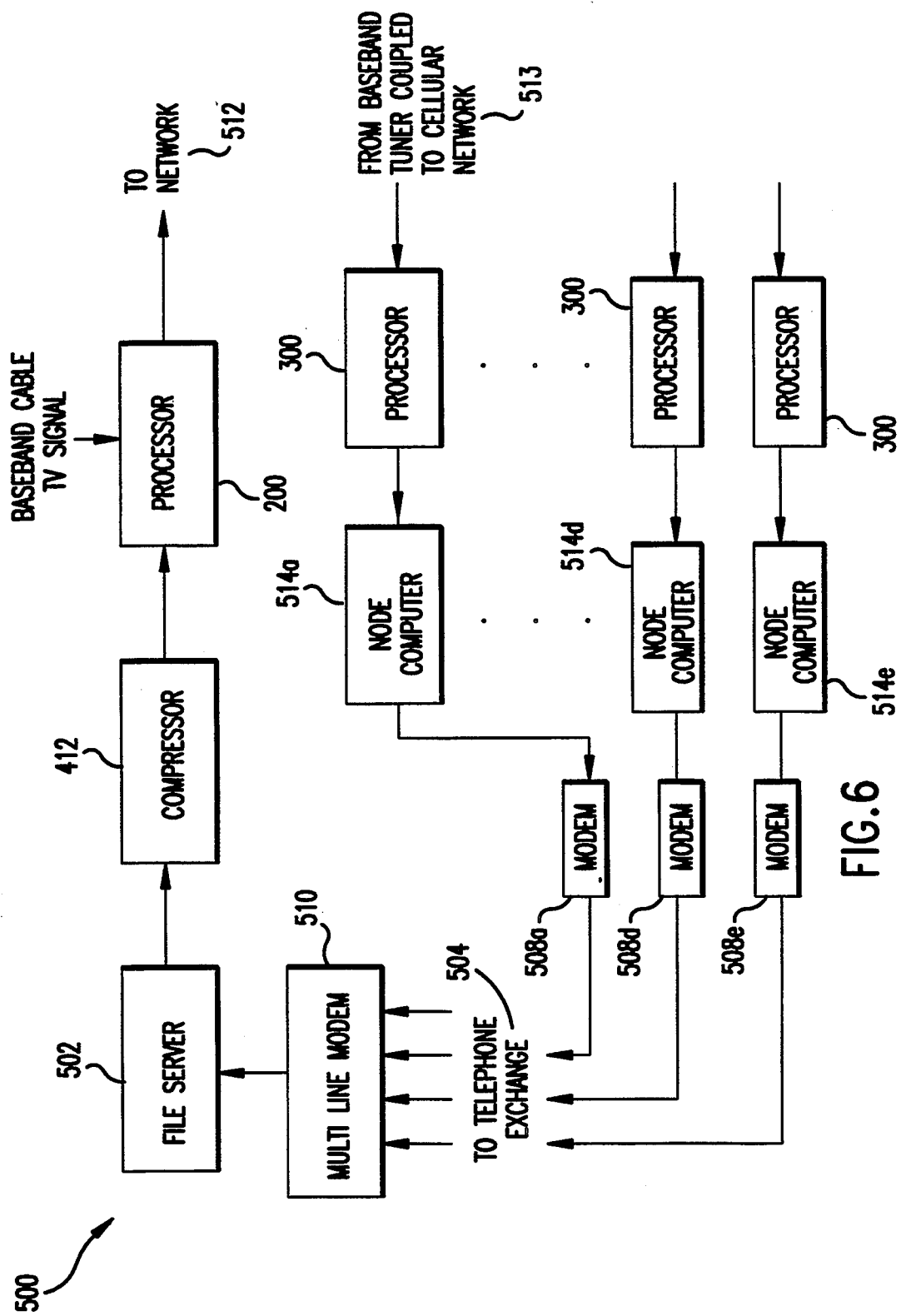
FIG. 6 is a block diagram of an embodiment of the instant invention for a computer network using both a cable television medium and a telephone lines.

For example, a two way embodiment 500 is shown in FIG. 6. Pictorial data such as PCX or TIFF format graphics may be stored on a network file server 502. Requests for particular stored graphical images may be requested through a telephone network 504 by users at one or more node computers 514 $a-e$ through an associated modem 508 $a-e$. The file server receives the request through a multi-line modem 510. The requested data such as a graphical image may be transmitted through a transmitter processor 200 over the cable network 512 to the tuner 513 coupled to one or more receiver processors 300. It may also be desirable to multiplex one processor 300. The digital data may then be supplied to the communications port of the appropriate node computer 514 $a-e$ for display. In addition, a data compressor 412 and decompression software may also be used to compress data for transmission over the network 512.

Each node computer 514 may be assigned a unique address. Information transmitted over the cable network 512 is encoded with the appropriate address(es) of the target node computer(s) 506 $a-e$ so that only a particular node or group of nodes receives the transmitted information.

An example of such a network as shown in FIG. 6 may be in the travel agency industry or in the direct sales industry. Users of computers 514 $a-e$ may transmit simple commands such as selecting items on a menu or selecting a sub menu. In response to the selection of the particular item or submenu, further graphical images based upon the selected choice are transmitted over the network in the combined signal to be shown on the display of the computer. For example, a user might type in the name of the city that he wants to visit, the acceptable price range for hotel rooms and other criteria. In response to entering that information, a sequence of graphical images may be transmitted over the network to the display of the computer so that the user may preview selected hotels within the criteria transmitted by the user.

Figure 7:
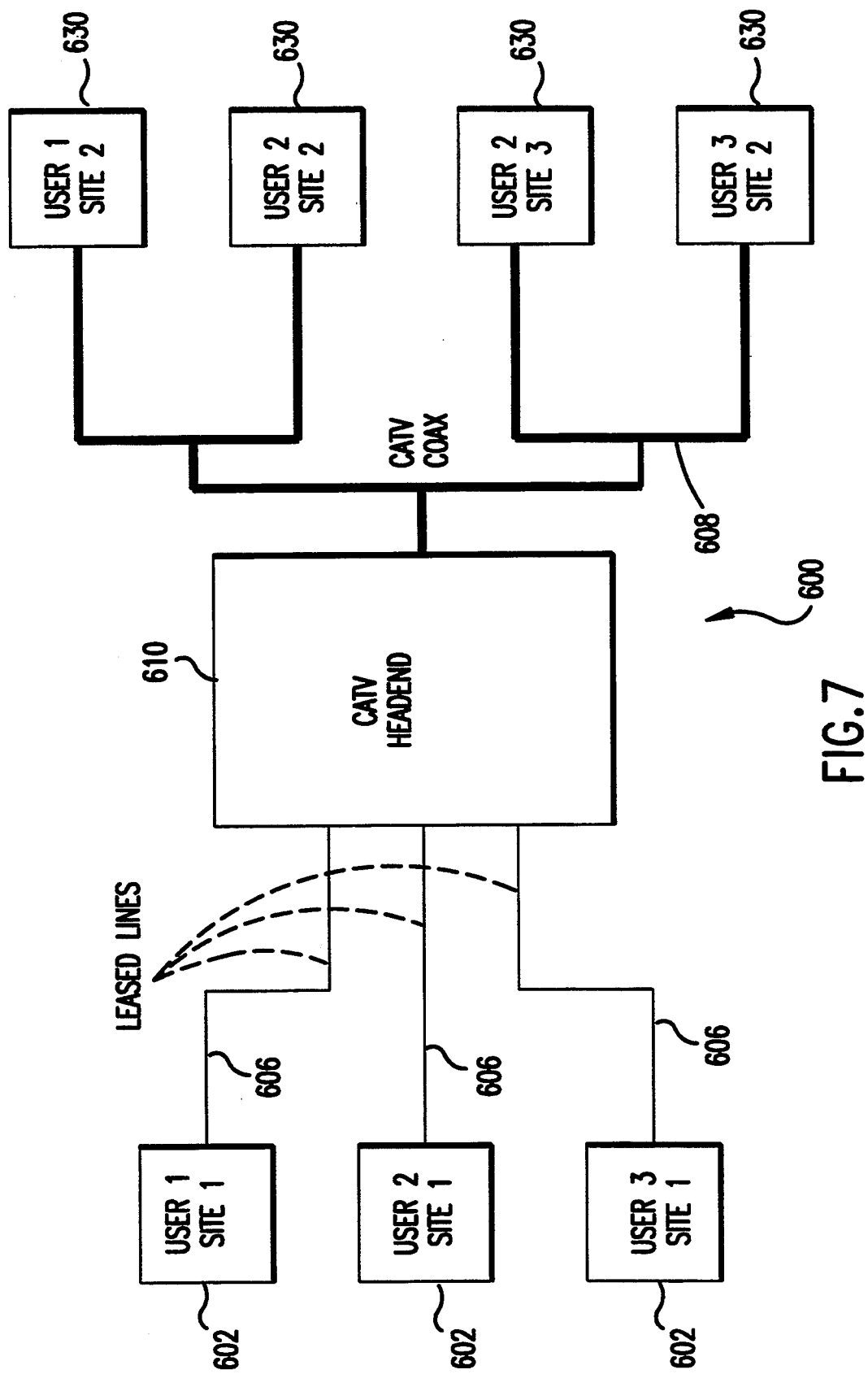
FIG. 7 is a block diagram for an embodiment of the instant invention for a two way computer network using a cable television transmission medium.

In yet another embodiment, a two way computer network 600 may be accomplished through use of the sub channels of a cable television network as shown in FIG. 7. A plurality of separate hub stations 602 are coupled to the cable television (CATV) head end 610 by leased telephone lines 606 or other appropriate media. Cable television (CATV) nodes 630 are coupled through the cable television coaxial cable network or optical fiber network 608 to the CATV head end 610. Alternatively a file server station (not shown) could be part of the head end 610 instead of using hub stations 602.

The network preferably uses a frame relay protocol with fast packet switching through use of a plurality of video channels. One or more of the forward control channels of the cable television network is used as a control channel for sending control information to the various CATV computer nodes 630. Data is transmitted from the head end 610 to the CATV computer nodes 630 via the regular television channels. Data is transmitted from the CATV computer nodes 630 to the head end 610 via sub channels such as T8, T9 and T10. The packet switching protocol permits multiple nodes 630 to share the same data channels to create the frame relay network. The network may use polled, token bus and CSMA/CD access methods for back channel control.

Figure 8:
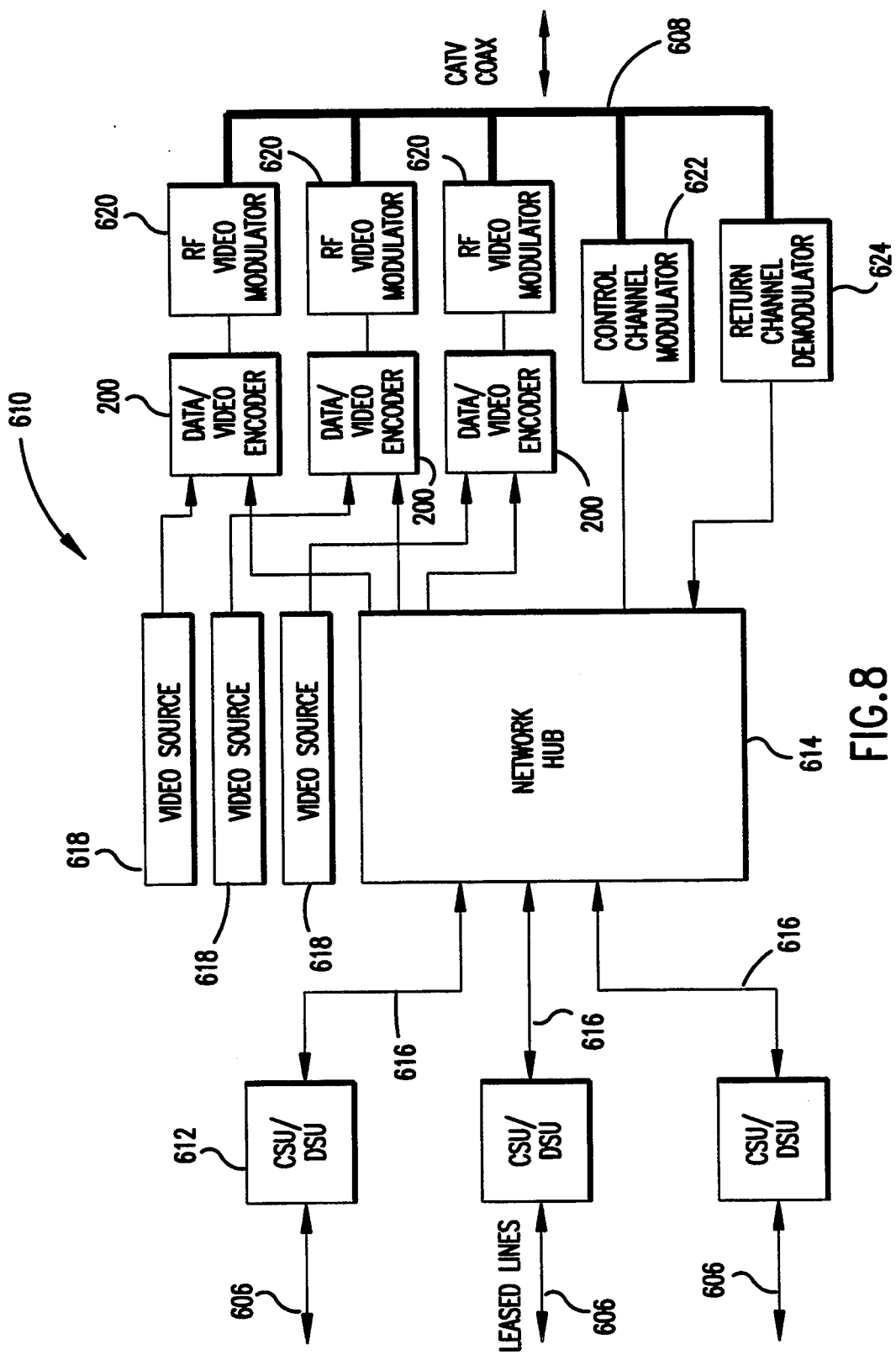
FIG. 8 is a further block diagram showing details of the head end shown in FIG. 7.

FIG. 8 shows a typical head end 610. The leased lines 606 are connected to a hub 612. Each leased line is coupled to a CSU/DSU (channel service unit/data service unit) 612 comprised of a suitable interface for a T1 or fractional T1 dedicated line such as those available from the Universal Data Systems (UDS) Division of Motorola Corporation. Each CSU/DSU is coupled to a network hub 614 via a bidirectional interface 616 such as the IEEE RS 449 interface or a V.35 interface. The network hub 614 controls assignment of the data received from the leased lines to one of a selected video processor 200 such as those described in FIG. 3. Each processor 200 also receives a baseband video signal from a suitable video source 618. The output of the video processor 200 is supplied to an appropriate RF video modulator 620 for transmission over one of the forward cable television channels on the coaxial cable 608. Suitable RF video modulators 620 may be obtained from Scientific Atlanta.

The network control information generated by the hub 614 is supplied to a forward control channel modulator 622 for transmission over the CATV coaxial cable 620. Information sent by the CATV computer nodes 630 on the sub channels is demodulated by a return channel demodulator 624 to be supplied to the hub 614. Frequency agile cable television modems available from EF Data of Tempe Ariz., Fairchild Data of Scottsdale Ariz. may be used to provide the control channel modulator 622 and return channel demodulator 624.

Figure 10:
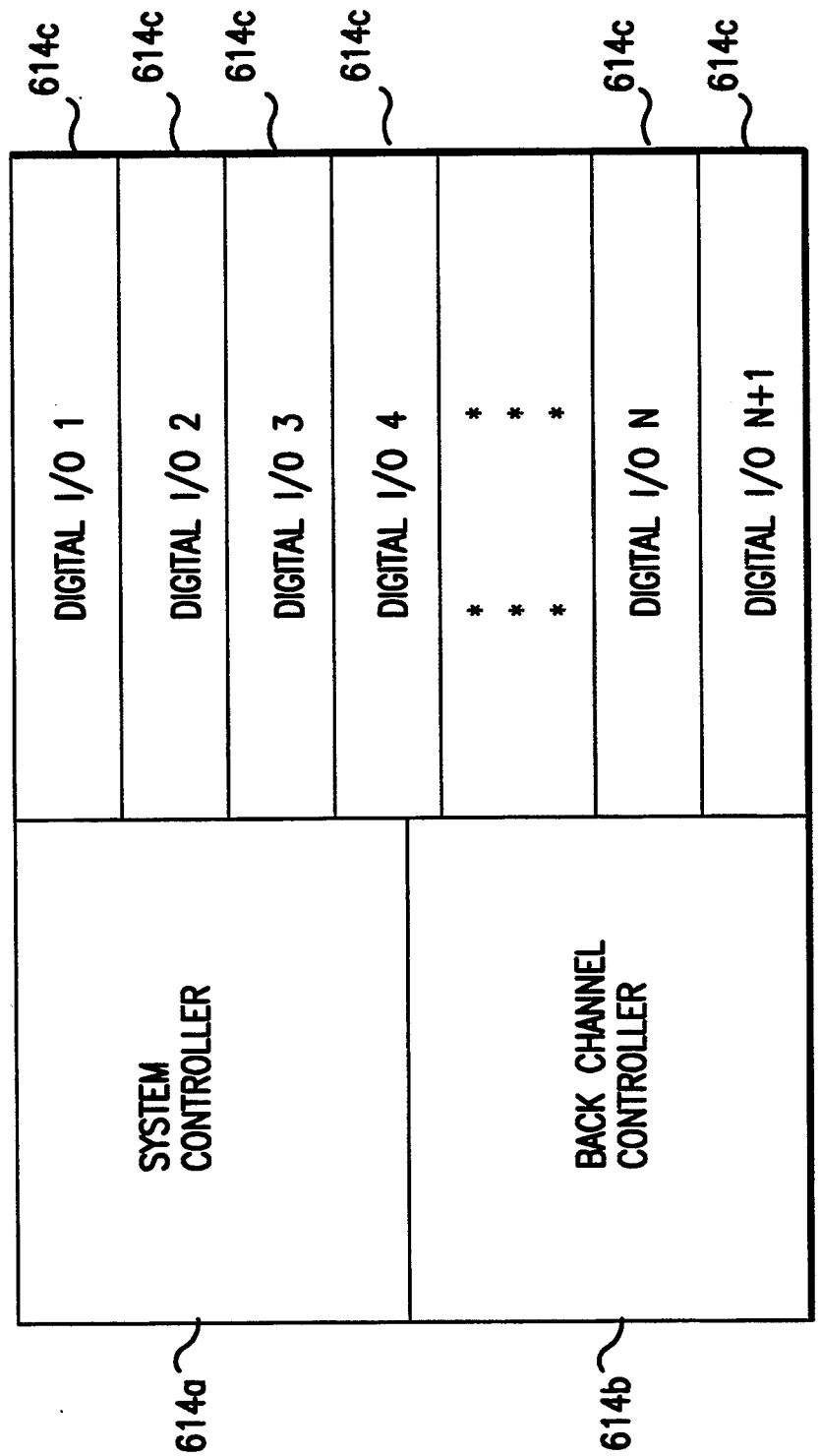
FIG. 10 is a block diagram showing further details of the hub of FIG. 8.

FIG. 10 shows the hub 614 in greater detail. The hub includes a system controller 614a, a back channel controller 614b, and a plurality of intelligent digital I/O boards 614c all coupled together by an IEEE VME backplane. The system controller 614a includes a central processing unit and a hard disk containing the overall system software for controlling the routing of data between various CSU/DSU's 612 and the CATV computer nodes 630. The back channel controller 614b handles arbitration of network transmission over the cable television network and furnishes the received data from the CATV computer nodes 630 to the various I/O boards 614c. The back channel controller 614b and the system controller 614a cooperate to handle equipment failure and data overload conditions within the network according to the appropriate protocol.

Each I/O board 614c preferably includes a controller (not shown). The controller for an I/O board 614c may packetize data and include the error correction codes for the packetized data to be furnished to the selected video processor 200. In such case, the packetizer 200 may be omitted. Further, the controller may depacketize data and do error correction for data received through the back channel controller 614b from a video station 630. Similarly, the controller for the I/O boards 614c coupled to CSU/DSU's 612 may packetize the data according to the appropriate protocol for the communications selected of the leased land lines 606.

Figure 9:
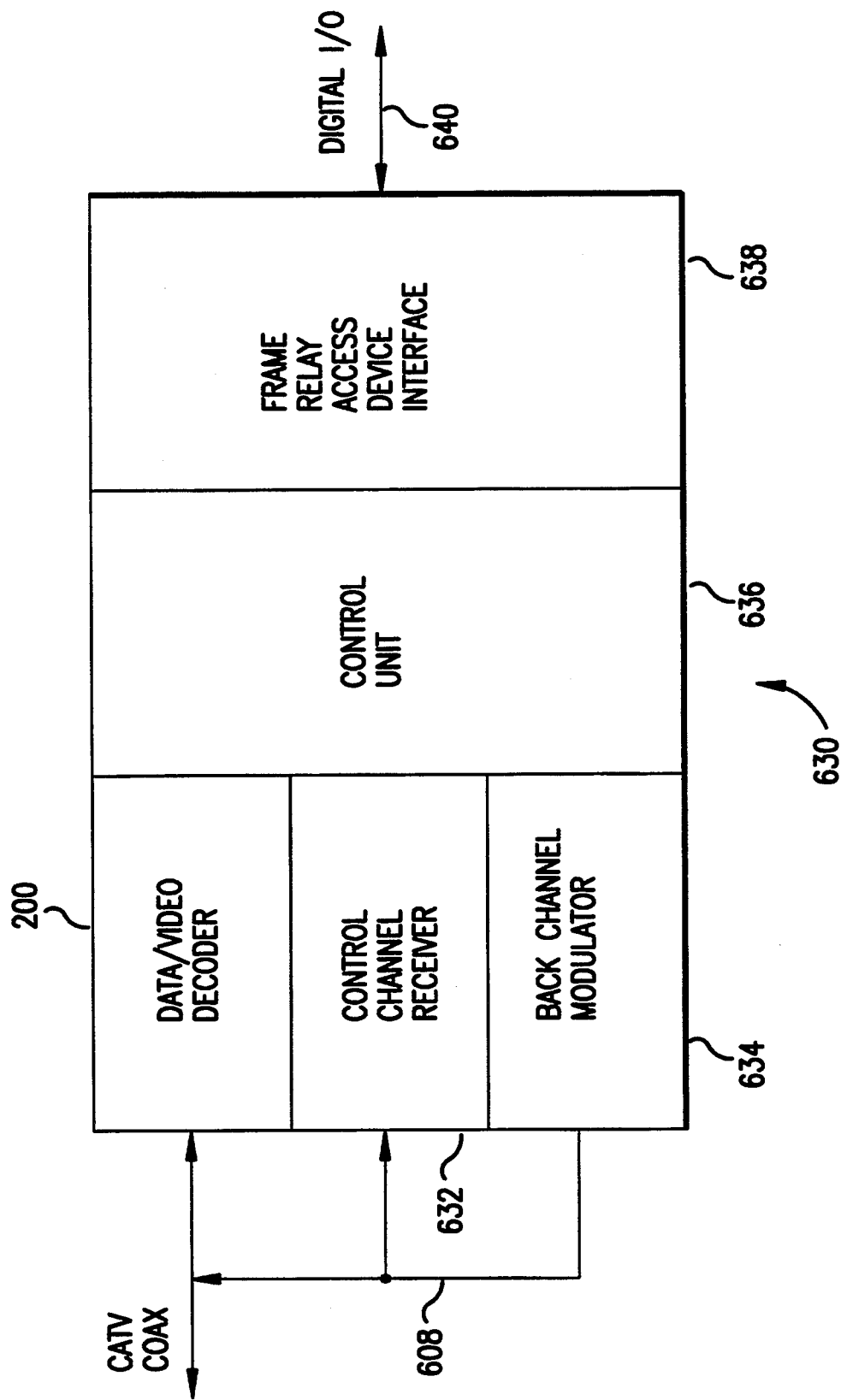
FIG. 9 is a further block diagram showing details of the node located at the customer.

FIG. 9 is a block diagram of the customer premise equipment (CPE) for a CATV computer station 630. A receiver processor 300 of the type shown in FIG. 4, a control channel receiver 632 and a back channel modulator 634 are coupled to the coaxial cable 608. The data/video decoder 300 receives data from the hub sent on an appropriate forward channel. The control channel receiver 632 and the back channel modulator 634 are the complement units of the control channel modulator 622 and the return channel demodulator 624 in the head end 610. The control unit comprises a microcontroller that controls the processor 300, the control channel receiver 632 and the back channel modulator 634. The control unit responds to control signals received by the receiver 634 and control signals produced by the frame relay access device interface 638 indicating that data is available to be transmitted. In response to control commands sent over the control channel, the control unit 636, the tuner in the processor 300 is tuned to the appropriate channel based upon control information sent from the hub 614 over the control channel. In addition, the control unit 634 provides the received data from the video processor 300 and furnishes that data to the frame relay access device interface 638. The frame relay access device interface 638 provides the data at the digital I/O 640 so that the station 630 may be coupled to a computer (not shown) or a local area network (not shown) or any other type of digital equipment.

By using the disclosed signal processors, the combined video/data signal may be demodulated and recovered by an ordinary video receiver (not shown) without the transmitted data causing noticeable interference on the television picture generated on the TV screen. The transmitted data may also be readily separated. It should be understood that the data provided to the signal processor may differ from the video signal in a number of different aspects. Before being rasterized, the data signal has a low cross-correlation with the video signal as the two signals may be completely unrelated. Therefore, a wide variety of data may be transmitted and is particularly useful in systems where one way communications is preferred. Nonetheless, the scope of the invention is defined by the claims.

We claim:

1. A processor for adding a data signal to a rasterized video signal having both chrominance and luminance portions and active and blanking video intervals, the processor comprising:
   a signal generator generating a data carrier;
   a modulator responsive to the data carrier providing a modulated data carrier;
   a combiner to combine the modulated data signal with the video signal during part of the active video intervals to provide a combined signal; and
   a controller to control the modulator such that the modulator provides an unmodulated data carrier burst at the start of at least some of the active video intervals.

2. The processor of claim 1, wherein the frequency of the data carrier is an odd quarter non-integral multiple of the data carrier.

3. The processor of claim 1, wherein the chrominance portion of the video signal has been generated by the modulation of a chrominance carrier and wherein the frequency of the data carrier is greater than the frequency of the chrominance carrier.

4. The processor of claim 2, wherein the chrominance portion of the signal has been generated by the modulation of a chrominance carrier and wherein the frequencies in the video signal above the chrominance carrier are substantially attenuated.

5. The processor of claim 1, wherein the processor further includes:
- a sync detector generating a composite sync signal marking each blanking and active video interval; and
- a clock generator providing a system clock signal referenced to the data carrier; and
- wherein the controller controls the output of the modulator to provide the modulated data only during the active intervals.

6. A processor for adding a data signal to a video signal having an active video portion and blanking intervals, a horizontal scanning frequency and a luminance and chrominance spectra, the chrominance spectra having an upper side band and a lower side band, the processor comprising:
- a video processor section including means for attenuating the upper side band of the chrominance spectra and outputting a partially attenuated video signal having blanking intervals;
- a carrier generator for generating a carrier at a frequency in the upper side band;
- a data signal section responsive to the data signal to produce an output rasterized data signal having blanking intervals synchronized to the blanking intervals of the video signal;
- a modulator for modulating the carrier with the rasterized data signal such that the spectral energy of the output of the modulator lies almost completely within the attenuated sideband; and
- an adder for injecting the modulated carrier into the partially attenuated video signal at a relatively low level of injection.

7. The processor of claim 6, wherein the data signal section further including means for inserting a specified phase synchronizer marker into the data signal for a predetermined portion of the data signal.

8. The processor of claim 6, wherein the data signal section further including means for band limiting the data signal.

9. The processor of claim 6, wherein the carrier generator provides a carrier generated by dividing the scanning rate by 4.

10. The processor of claim 6, wherein the video section further includes an automatic gain control amplifier and a DC level restore circuit responsive to the video signal to provide a standardized video signal substantially complying with a predetermined standard, and a low pass, equalized filter for attenuating frequencies in the upper sideband of the chrominance spectra of that signal.

11. A processor for isolating a rasterized, modulated data signal in a video signal having a horizontal scanning rate, the rasterized data signal lying within a portion of the frequency band for the video signal and the data signal having been injected into the active portions of the video signal by modulating a data carrier based upon the data to be transmitted and at least some portions of the data carrier being unmodulated to comprise a phase synchronization marker in the video signal, the processor comprised:
- a filter to attenuate those portions of the spectra not containing the data signal;
- a phase adjustable data carrier generator for generating a data carrier;
- a demodulator responsive to the carrier and the filtered data signal;
- detection means for detecting the phase synchronizer marker; and
- means for altering the phase of the carrier generator in response to the detected marker.

12. The processor of claim 11, the data carrier generator generating a carrier at about an odd quarter nonintegral multiple of the scanning rate.

13. The processor of claim 11, the processor further including:
- a first tuner providing a portion of the combined signal having the blanking interval;
- a detector generating a signal denoting the blanking intervals, wherein the means for detecting the phase marker is responsive to the blanking interval signal; and
- a second tuner providing a portion of the combined signal containing the spectral energy of the data to the filter.

14. A method for receiving data information combined with both the chrominance and luminance information of a rasterized signal having an active video interval, the data information having been modulated with a transmitter data carrier and including a phase marker comprising an unmodulated burst of the data carrier injected in the active video interval, the method comprising:
- generating a receiver data carrier at substantially the same frequency as the transmitter data carrier;
- demodulating the information from the signal;
- locating the marker information in the active video line; and
- altering the phase of the data carrier in response to the phase marker.

15. The method of claim 14, wherein the data information includes a high definition graphical image and the method further includes:
- removing the phase marker information from the data information; and
- displaying the graphical information on an appropriate medium.

16. A method for transmitting a data signal with a video signal having video blanking intervals of a certain period, the data and video signals being substantially uncorrelated, the method comprising:
- detecting the timing of the blanking intervals;
- rasterizing the data signal to provide data blanking intervals in the rasterized data signal, the data blanking intervals being a predetermined interval longer than the video blanking intervals;
- generating a data carrier; and
- combining the video and the rasterized data signal with the data carrier such that each video blanking interval begins substantially at the same time as the data blanking intervals such that the combined signal includes an unmodulated data carrier burst during intervals other than during the blanking interval.

17. The method of claim 16, wherein the video signal has an active video interval between blanking intervals, the method further comprising:
- generating a data carrier burst at the start of each active line interval;
- including a data carrier burst in the combined signal.

18. The method of claim 16, the method further comprising inserting in the active video interval a predetermined sequence of ones as a phase synchronization marker.

19. The method of claim 16, the method further including dividing the data signal into packets, the start and stop of each packet being defined by an unique code.

20. The method of claim 16, the method further including inserting a phase synchronizer marker at the start of each active video interval.

21. A processor for receiving a video signal having active video line intervals and blanking video intervals at a sync rate separating the active video lines and the data injected into the video by modulating a data carrier having a predetermined frequency, and an unmodulated burst of the data carrier having a phase and the burst appearing at a predetermined portion of at least some active video lines, wherein the processor includes:
  a timing circuit responsive to the sync pulses and generating a timing signal indicating the timing of the data carrier bursts in the video signal; and
  a local data carrier generator responsive to the timing signal and the video signal to producing a local data carrier in a predetermined phase relationship with the phase of the data carrier burst.

22. The processor of claim 21, wherein the data signal comprises a bandwidth within the video signal and the processor includes:
  a tuner producing a composite sync pulse based upon the sync pulses in the video signal and a data signal containing the data bandwidth;
  means for coupling the composite sync signal to the sync detector; and
  means for coupling the data signal to the carrier generator.

23. The processor of claim 22, wherein the means for coupling the data signal includes a filter having a time delay responsive to the data signal and coupled to the input of the data carrier generator; and
  the timing circuit introducing a delay in the timing signal equal to the delay of the filter.

24. The processor of claim 23, wherein the processor includes a:
  a demodulator responsive to the local data carrier and the video signal to reproduce the data signal.

25. The processor of claim 24, wherein the processor further includes:
  a means for sampling the output of the demodulator to reconstruct the data.

26. The processor of claim 25, wherein the timing circuit further produces a timing signal to control the timing of the sampling.

27. A method for separating a data signal that has been injected at a remote location into the bandwidth of a video signal having parameters including blanking intervals at a sync rate with active video lines between the blanking intervals, the injection including modulating a remote data carrier having a frequency and a phase and injecting at predetermined intervals in the signal an unmodulated remote data carrier burst having a phase, the method comprising:
  monitoring at least one of the parameters of the video signal;
  determining the relative timing of the data carrier burst based upon the monitoring of the at least one parameter;
  determining in response to the video signal during the data carrier bursts the relative phase of the data carrier; and
  generating a local data carrier in a predetermined phase relationship with the phase of the remote data carrier.

28. The method of claim 27, wherein the method further includes demodulating the modulated data carrier with the local data carrier.

29. The method of claim 28, wherein the monitoring of the parameter comprises determining the sync intervals of the video signal.

30. The method of claim 29, wherein the determining of the sync intervals comprises:
  receiving the video signal;
  generating the sync pulses in the video signal; and
  detecting the timing of the synch pulses.

31. The method of claim 28, wherein the method further includes:
  separating the portion of the bandwidth of the data signal containing the video information from the video signal; and
  providing the bandwidth portion for determining the phase of the remote data carrier burst.

32. A method for adding a data signal to a video signal having an active video portion and blanking intervals, a horizontal scanning frequency and a luminance and chrominance spectra, the chrominance spectra having an upper side band and a lower side band, the processor comprising:
  attenuating the upper side band of the chrominance spectra and outputting a partially attenuated video signal having blanking intervals;
  generating a data carrier at a frequency in the upper side band;
  providing an output rasterized data signal having blanking intervals synchronized to the blanking intervals of the video signal;
  modulating the data carrier with the rasterized data signal such that the spectral energy of the output of the modulator lies almost completely within the attenuated sideband; and
  adding the modulated carrier into the attenuated video signal at a relatively low level of injection.

33. The method of claim 32, wherein the method further comprises only adding the modulated data carrier into the video signal during the active video intervals.

34. The method of claim 33, wherein the method further comprises injecting an unmodulated burst of the data carrier into the active video intervals.

35. The method of claim 34, wherein the method further comprises injecting the unmodulated bursts only during predetermined portions of the active video intervals.

36. The method of claim 32, wherein the method further comprises adding information to the data signal to serve as a phase marker.

37. The method of claim 36, wherein the marker comprises a string of bits having a predetermined sequence.

* * * * *